United States Patent [19]

Bach et al.

[11] Patent Number: 5,101,035
[45] Date of Patent: Mar. 31, 1992

[54] MEROCYANINE-LIKE THIAZOLE DYES AND THERMAL TRANSFER THEREOF

[75] Inventors: Volker Bach, Neustadt; Karl-Heinz Etzbach, Frankenthal; Gunther Lamm, Hassloch; Ruediger Sens, Mannheim; Klaus Unterforsthuber, Dannstadt-Schauernheim; Rosemarie Rausch-Krebs, Frankfurt, all of Fed. Rep. of Germany

[73] Assignee: BASF Aktiengesellschaft, Ludwigshafen, Fed. Rep. of Germany

[21] Appl. No.: 571,900

[22] Filed: Aug. 24, 1990

[30] Foreign Application Priority Data

Aug. 26, 1989 [DE] Fed. Rep. of Germany ....... 3928243

[51] Int. Cl.$^5$ .................. C07D 277/42; B91M 5/035; B41M 8/26
[52] U.S. Cl. ..................... 548/191; 548/192; 503/227
[58] Field of Search ................. 548/191, 192; 503/227

[56] References Cited

U.S. PATENT DOCUMENTS

| | | | |
|---|---|---|---|
| 2,951,847 | 9/1960 | Baumann | 548/191 |
| 4,760,049 | 7/1988 | Etzbach et al. | 503/227 |
| 4,769,360 | 9/1988 | Evans et al. | 503/227 |
| 4,829,047 | 5/1989 | Niwa et al. | 503/227 |

FOREIGN PATENT DOCUMENTS

| | | |
|---|---|---|
| 0111004 | 6/1984 | European Pat. Off. . |
| 0133011 | 2/1985 | European Pat. Off. . |
| 0133012 | 2/1985 | European Pat. Off. . |
| 0192435 | 8/1986 | European Pat. Off. . |
| 0216483 | 4/1987 | European Pat. Off. . |
| 0227094 | 7/1987 | European Pat. Off. . |
| 0227095 | 7/1987 | European Pat. Off. . |
| 0227096 | 7/1987 | European Pat. Off. . |
| 0275381 | 7/1988 | European Pat. Off. . |
| 0291853 | 11/1988 | European Pat. Off. . |
| 3524519 | 1/1986 | Fed. Rep. of Germany . |
| 3716656 | 12/1988 | Fed. Rep. of Germany . |
| 127392 | 2/1986 | Japan . |
| 237694 | 4/1986 | Japan . |
| 283595 | 5/1986 | Japan . |
| 199997 | 7/1986 | Japan . |
| 2001094 | 1/1979 | United Kingdom . |

OTHER PUBLICATIONS

Methoden Der Organischen Chemie, vol. VII/3b, pp. 262–265, P. Grunanger, "Chinonimine".
Methoden Der Organischen Chemie, vol. VII/3b, pp. 299–301, P. Grunanger, "Chinonimine".

Primary Examiner—Robert Gerstl
Attorney, Agent, or Firm—Oblon, Spivak, McClelland, Maier & Neustadt

[57] ABSTRACT

Useful thermal transfer dyes are thiazole dyes having the formula

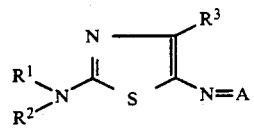

where
$R^1$ and $R^2$ are each, independently of the other, hydrogen, substituted or unsubstituted alkyl, substituted or unsubstituted phenyl or cyclohexyl or together with the linking nitrogen atom a heterocyclic radical,
$R^3$ is hydrogen, halogen, alkyl, substituted or unsubstituted phenyl, benzyl, cyclohexyl, hydroxyl, furyl or thienyl, and
A is a cyclohexadienone radical which may be substituted and/or benzofused.

3 Claims, No Drawings

MEROCYANINE-LIKE THIAZOLE DYES AND THERMAL TRANSFER THEREOF

The present invention relates to novel thiazole dyes of the formula I

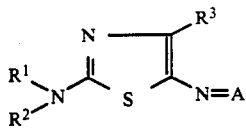   (I)

where $R^1$ and $R^2$ are identical or different and each is, independently of the other, alkyl, which may be interrupted by from 1 to 3 oxygen atoms, alkanoyloxyalkyl or alkoxycarbonyloxyalkyl, which may each have up to 18 carbon atoms and be substituted by phenyl, $C_1$-$C_4$-alkylphenyl, $C_1$-$C_4$-alkoxyphenyl, hydroxyl, cyclohexyl or cyano, hydrogen, unsubstituted or $C_1$-$C_{14}$-alkyl- or $C_1$-$C_4$-alkoxy-substituted phenyl, cyclohexyl or a radical of the formula

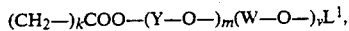

where
k is 2, 3 or 4,
m and v are identical or different and each is, independently of the other, 0, 1 or 2,
Y and W are identical or different and each is, independently of the other, $C_2$-$C_6$-alkylene and $L^1$ is $C_1$-$C_4$-alkyl or unsubstituted or $C_1$-$C_4$-alkyl- or $C_1$-$C_4$-alkoxy-substituted phenyl,
or $R^1$ and $R^2$, together with the linking nitrogen atom, are a 5- or 6-membered saturated heterocyclic radical which may contain further hetero atoms and be substituted by $C_1$-$C_6$-alkyl,
$R^3$ is hydrogen, halogen, $C_1$-$C_8$-alkyl, unsubstituted or $C_1$-$C_4$-alkyl- or $C_1$-$C_4$-alkoxy-substituted phenyl, unsubstituted or $C_1$-$C_4$-alkyl- or $C_1$-$C_4$-alkoxy-substituted benzyl, cyclohexyl, hydroxyl, furyl or thienyl, and
A is a radical of the formula

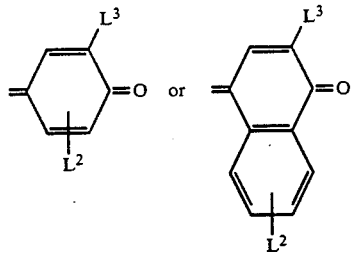

where
$L^2$ is hydrogen, fluorine, chlorine, bromine, hydroxyl, nitro $C_1$-$C_4$-alkyl, cyano, $C_1$-$C_4$-alkyl-sulfonylamino or a radical of the formula $COOR^1$, $CONHR^1$, $NHCOR^1$ or $NHSO_2R^1$, in each of which $R^1$ is as defined above, and
$L^3$ is hydrogen, fluorine, chlorine, cyano or a radical of the formula $CONHL^4$, $NHCOL^4$, $NHCONHL^4$, $SO_2NHL^4$, $NHSO_2L^4$ or $COOR^1$, where $R^1$ is as defined above and $L^4$ is in each case alkoxycarbonylphenyl, alkoxycarbonyloxyphenyl, alkanoylphenyl or N-monoalkylcarbamo-vlphenyl, the alkyl moieties in these groups having up to 12 carbon atoms, phenyl, thiazolyl or $C_1$-$C_{12}$-alkyl, which may be interrupted by from 1 to 3 oxygen atoms,
and a process for the thermal transfer of these dyes.

DE-A-3 524 519 discloses dyes which are prepared by oxidative coupling of p-phenylenediamines onto phenols and which find use in the thermal transfer printing of coated papers.

Similar dyes for the same use, where naphthols are used instead of phenols, are described in EP-A-227 096 and U.S. Pat. No. 4,769,360.

It is an object of the present invention to provide new merocyanine-like dyes which have a heterocyclic radical. The new dyes should have advantageous application properties.

We have found that this object is achieved by the thiazole dyes of the formula I described at the beginning.

Any alkyl appearing in the abovementioned formula is either straight-chain or branched $R^1$, $R^2$, $R^3$, $L^1$, $L^2$ and $L^4$ are each for example methyl, ethyl, propyl, isopropyl, butyl, isobutyl, secbutyl or tert-butyl.

$R^1$, $R^2$, $R^3$ and $L^4$ may each also be for example pentyl, isopentyl, neopentyl, tert-pentyl, hexyl, 2-methylpentyl, heptyl, octyl, 2-ethylhexyl or isooctyl.

$R^1$, $R^2$ and $L^4$ may each also be for example nonyl, isononyl, decyl, isodecyl, undecyl or dodecyl.

$R^1$ and $R^2$ may each also be for example tridecyl, isotridecyl, tetradecyl, pentadecyl, hexadecyl, heptadecyl or octadecyl (the designations isooctoyl, isononyl, isodecyl and isotridecyl are trivial names which are derived from the alcohols obtained by the oxo process (cf. on this point Ullmanns Encyklopädie der technischen Chemie, 4th edition, volume 7, pages 215 to 217, and volume 11, pages 435 and 436)), 2-methoxyethyl, 2-ethoxyethyl, 2-propoxyethyl, 2-butoxyethyl, 2- or 3-methoxypropyl, 2- or 3-ethoxypropyl, 2- or 3-propoxypropyl, 2- or 3-butoxypropyl, 4-methoxybutyl, 4-ethoxybutyl, 4-butoxybutyl, 8-butoxyoctyl, 2-cyanoethyl, 3-cyanopropyl, 4-cyanobutyl, 2-hydroxyethyl, 5-hydroxynonyl, 4-(2-methylphenyl)butyl, 3-phenylbutyl, 2-methoxybenzyl,

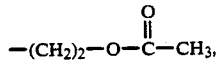

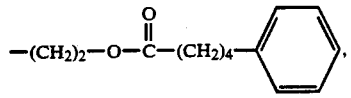

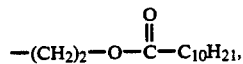

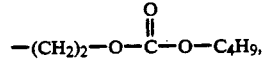

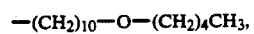

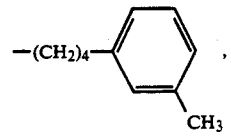

-continued

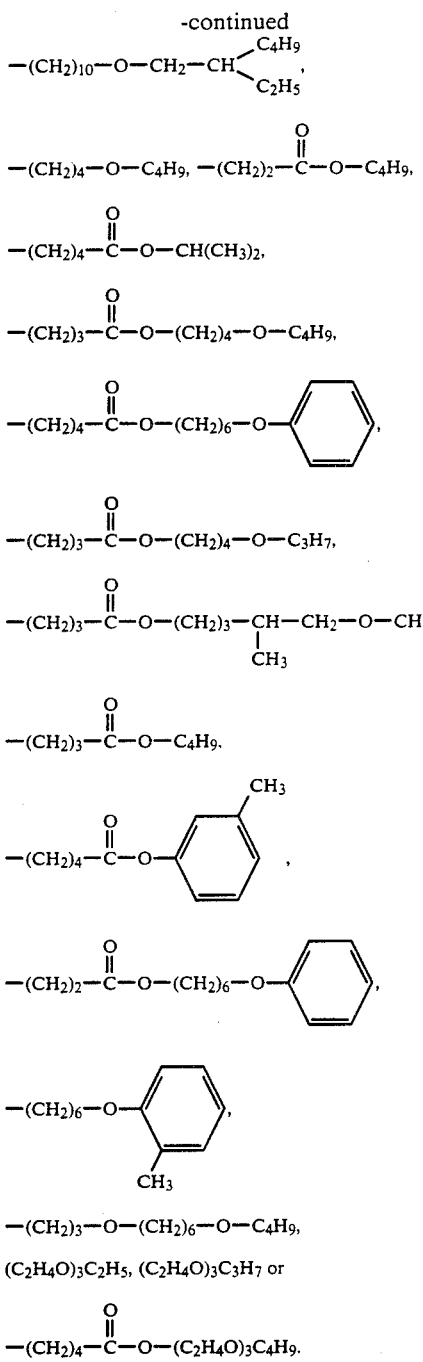

$R^1$, $R^2$, $R^3$ and $L^1$ may each also be for example phenyl, 2-, 3- or 4-methylphenyl, 2- or 4-isopropylphenyl, 2-butylphenyl, 2-, 3- or 4-methoxyphenyl, 2-propoxyphenyl, 4-butoxyphenyl or 2-(but-2-oxy)phenyl.

When $R^1$ and $R^2$ together with the linking nitrogen atom are a 5- or 6-membered saturated heterocyclic radical, it may be substituted by $C_1$–$C_6$-alkyl and contain further hetero atoms, for example another nitrogen atom or oxygen.

Individual heterocyclic radicals are for example pyrrolidino, piperidino, morpholino, piperazino, 2-methylpyrrolidino, 3-butylpyrrolidino, 4-ethylpiperidino, 2,6-dimethylpiperidino, 2-(pent-2-yl)piperidino, 2-methylmorpholino, 3-ethyl-5-methylmorpholino, N-methylpiperazino, N-ethylpiperazino, 3-butylhexahydropyrimidin-1-yl or 3,6-dimethylhexahydropyrimidin-1-yl.

$L^4$ may also be for example thiazol-2-yl, thiazol-5-yl, 4-propanoylphenyl, 4-pentanoylphenyl, 4-(4-methylpentanoyl)phenyl, 4-ethoxycarbonylphenyl, 4-propoxycarbonylphenyl, 4-butoxycarbonylphenyl, 4-pentyloxycarbonylphenyl or 4-(N-ethyl- or N-hexyl-carbamoyl)phenyl.

Preference is given to thiazole dyes of the formula II

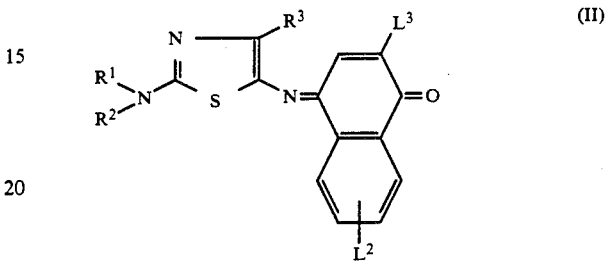

where
$R^1$ and $R^2$ are each, independently of the other, alkyl, which may be interrupted by from to 3 oxygen atoms, alkanoyloxyalkyl or alkoxycarbonylalkyl, which may each have up to 12 carbon atoms, or together with the linking nitrogen atom, a 5- or 6-membered saturated heterocyclic radical which may contain further hetero atoms,
$L^2$ is hydrogen or a radical of the formula $CONHR^1$, $NHCOR^1$ or $NHSO_2R^1$, where $R^1$ is in each case as defined above, and
$L^3$ is a radical of the formula $CONHL^4$, $NHCOL^4$, $SO_2NHL^4$ or $NHSO_2L^4$,
where $R^3$ and $L^4$ are each as defined above.

Particular preference is given to thiazole dyes of the formula IIa

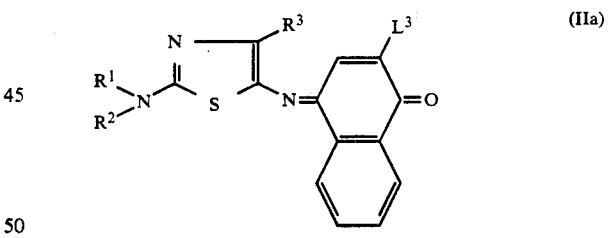

where
$R^1$ and $R^2$ are each, independently of the other, $C_1$–$C_8$-alkyl, which may be interrupted by an oxygen atom, or together with the linking nitrogen atom pyrrolidino, piperidino or morpholino,
$R^3$ is phenyl, which may be substituted by methyl or methoxy, benzyl, which may be substituted by methyl or methoxy, or thienyl, and
$L^3$ is a radical of the formula $CONHL^4$, $NHCOL^4$, $SO_2NHL^4$ or $NHSO_2L^4$,
where $L^4$ is $C_1$–$C_8$-alkyl, which may be interrupted by an oxygen atom, phenyl, thiazolyl, 4-($C_1$–$C_8$-alkoxycarbonyl)phenyl or 4-[N-($C_1$–$C_8$-monoalkyl)carbamoyl]phenyl.

The thiazole dyes of the formula I according to the present invention are prepared in a conventional manner.

For instance, a thiazole of the formula III

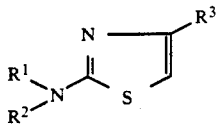
(III)

where $R^1$, $R^2$ and $R^3$ are each as defined above, is reacted with a quinone derivative of the formula IVa or IVb

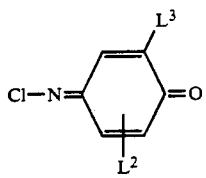
(IVa)

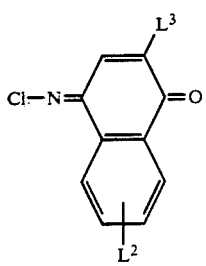
(IVb)

where $L^2$ and $L^3$ are each as defined above (variant A—see for example Houben-Weyl, Methoden der Organischen Chemie, volume Quinones II, pages 262 to 265 and also 299 ff). The quinones IVa and IVb are obtained by oxidation of the corresponding p-amino compounds.

However, it is also possible to nitrosate the thiazole III and then to condense the nitroso compound with a phenol of the formula Va or a naphthol of the formula Vb

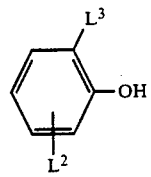
(Va)

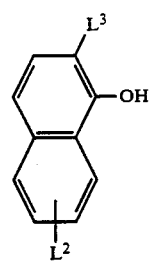
(Vb)

where $L^2$ and $L^3$ are each as defined above (variant B—see for example DE-A-3 716 656).

It is a further object of the present invention to provide a new process for the thermal transfer of dyes.

In the thermal transfer printing process, a transfer sheet which contains a thermally transferable dye in one or more binders, with or without suitable assistants, on a substrate is heated from the back with a heat source in short heating pulses (duration: fractions of a second), as a result of which the dye migrates out of the transfer sheet and diffuses into the surface coating of a receiving medium. The essential advantage of this process is that the amount of dye to be transferred (and hence the color gradation) is easy to control by adjusting the energy supplied to the heat source.

In general, color recording is carried out using the three subtractive primaries yellow, magenta and cyan (with or without black). To ensure optimal color recording, the dyes must have the following properties:
ready thermal transferability,
little tendency to migrate within or out of the surface coating of the receiving medium at room temperature,
high thermal and photochemical stability and also resistance to moisture and chemical substances,
suitable hues for subtractive color mixing,
a high molar absorption coefficient,
resistance to crystallization on storage of the transfer sheet,
ready industrial availability.

Experience shows that these requirements are very difficult to meet all at once.

For this reason most of the existing thermal transfer printing dyes fall short of the postulated ideal.

We have found that this object is achieved, and that the transfer of merocyanine-like dyes from a transfer to plastic-coated paper with the aid of an energy source is possible to advantageous effect, on using a transfer on which there is or are situated one or more thiazole dyes of the formula I

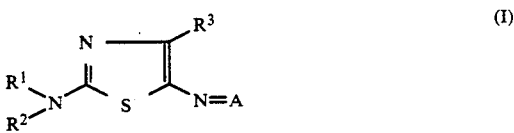
(I)

where $R^1$ and $R^2$ are identical or different and each is, independently of the other, alkyl, which may be interrupted by from 1 to 3 oxygen atoms, alkanoyloxyalkyl or alkoxycarbonyloxyalkyl, which may each have up to 18 carbon atoms and be substituted by phenyl, $C_1$-$C_4$-alkylphenyl, $C_1$-$C_4$-alkoxyphenyl, hydroxyl, cyclohexyl or cyano, hydrogen, unsubstituted or $C_1$-$C_4$-alkyl- or $C_1$-$C_4$-alkoxy-substituted phenyl, cyclohexyl or a radical of the formula

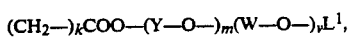

where
k is 2, 3 or 4,
m and v are identical or different and each is, independently of the other, 0, 1 or 2,
Y and W are identical or different and each is, independently of the other, $C_2$-$C_6$-alkylene and
$L^1$ is $C_1$-$C_4$-alkyl or unsubstituted or $C_1$-$C_4$-alkyl or $C_1$-$C_4$-alkoxy-substituted phenyl,
or $R^1$ and $R^2$, together with the linking nitrogen atom, are a 5- or 6-membered saturated heterocyclic radical which may contain further hetero atoms and be substituted by $C_1$-$C_6$-alkyl,
$R^3$ is hydrogen, halogen, $C_1$-$C_8$-alkyl, unsubstituted or $C_1$-$C_4$-alkyl- or $C_1$-$C_4$-alkoxy-substituted phenyl, unsubstituted or $C_1$-$C_4$-alkyl- or $C_1$-$C_4$-alkoxy-substituted benzyl, cyclohexyl, hydroxyl, furyl or thienyl, and A is a radical of the formula

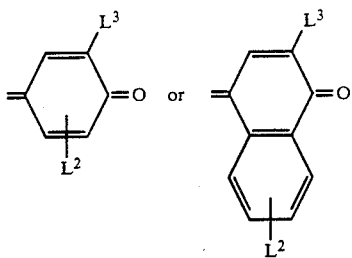

where

L² is hydrogen, fluorine, chlorine, bromine, hydroxyl, nitro, $C_1$-$C_4$-alkyl, cyano, $C_1$-$C_4$-alkylsulfonylamino or a radical of the formula $COOR^1$, $CONHR^1$, $NHCOR^1$ or $NHSO_2R^1$, in each of which $R^1$ is as defined above, and L³ is hydrogen, fluorine, chlorine, cyano or a radical of the formula $CONHL^4$, $NHCOL^4$, $NHCONHL^4$, $SO_2NHL^4$, $NHSO_2L^4$ or $COOR^1$, where $R^1$ is as defined above and $L^4$ is in each case alkoxycarbonylphenyl, alkoxycarbonyloxyphenyl, alkanoylphenyl or N-monoalkylcarbamoylphenyl, the alkyl moieties in these groups having up to 12 carbon atoms, phenyl, thiazolyl or $C_1$-$C_{12}$-alkyl, which may be interrupted by from 1 to 3 oxygen atoms.

Preference is given to the process involving the dyes of the abovementioned formula II, in particular the dyes of the abovementioned formula IIa.

A suitable energy source for the process according to the present invention is for example a thermal printing head or else a laser. The use of a thermal printing head is preferred.

To prepare the transfer required for the novel process, the dyes are incorporated into a suitable organic solvent, e.g. chlorobenzene, isobutanol, methyl ethyl ketone, methylene chloride, toluene, tetrahydrofuran or a mixture thereof, together with one or more binders and with or without the addition of other auxiliaries to form a printing ink, in which the dye is preferably present in a molecularly dispersed, i.e. dissolved, form. The printing ink is applied to the inert substrate by knife coating and the coating is dried in air.

Suitable binders are all resins and polymer materials which are soluble in organic solvents and capable of binding the dye to the inert substrate in such a way that it will not rub off. Preference is given to those binders which, after the printing ink has dried in air, hold the dye in the form of a clear, transparent film without visible crystallization of the dye.

Examples of such binders are cellulose derivatives, e.g. methylcellulose, ethylcellulose, ethylhydroxyethylcellulose, hydroxypropylcellulose, cellulose acetate or cellulose acetobutyrate, starch, alginates, alkyd resins, vinyl resins, polyvinyl alcohol, polyvinyl acetate, polyvinyl butyrate and polyvinylpyrrolidones. It is also possible to use polymers and copolymers of acrylates or derivatives thereof, such as polyacrylic acid, polymethyl methacrylate or styrene-acrylate copolymers, polyester resins, polyamide resins, polyurethane resins or natural CH resins, such as gum arabic. Other suitable binders are described for example in DE-A-3 524 519.

The preferred binders are ethylcellulose, ethylhydroxyethylcellulose, polyvinyl butyrate and polyvinyl acetate.

The ratio of binder to dye is preferably within the range from 1:1 to 5:1 by weight.

Suitable assistants are for example release agents as described in EP-A-227 092, EP-A-192 435 and the patent applications cited therein and also in particular organic additives which stop the transfer dye from crystallizing in the course of storage or heating of the inked ribbon, for example cholesterol or vanillin.

Inert substrates are for example tissue, blotting or parchment paper or plastics films of high heat stability, for example uncoated or metal-coated polyester, polyamide or polyimide. The inert substrate may additionally be coated on the side facing the energy source with a lubricant, or slipping, layer in order to prevent adhesion of the energy source to the substrate material. Suitable lubricants are described for example in EP-A-216 483 and EP-A-227 095. The thickness of the substrate is in general from 3 to 30 μm, preferably from 5 to 10 μm.

Suitable dye receiver layers are basically all temperature stable plastic layers having an affinity for the dyes to be transferred and preferably glass transition temperatures (Tg) within the range 50° C.<Tg<100° C., e.g. modified polycarbonates and polyesters. Suitable recipes for the receiver layer composition are described in detail for example in EP-A-227 094, EP-A-133 0 12, EP-A-133 011, EP-A-111 004, JP-A-199 997/1986, JP-A-283 595/1986, JP-A-237 694/1986 and JP-A-127 392/1986.

Transfer is preferably effected by means of a thermal printing head which must be heatable to ≧300° C. for dye transfer to take place within the time interval t: 0<t<15 msec. On heating, the dye migrates out of the transfer sheet and diffuses into the surface coat of the receiving medium.

Compared with the dyes used in existing processes, the novel dyes transferred in the process according to the present invention are in general notable for improved migration properties in the receiving medium at room temperature, readier thermal transferability, readier industrial availability, better resistance to moisture and chemical substances, higher color strength, better solubility, higher light fastness and in particular better purity of hue.

The Examples which follow further illustrate the invention. Percentages are by weight, unless otherwise stated.

Preparation of the Thiazole Dyes

Example of the Synthesis by Variant A

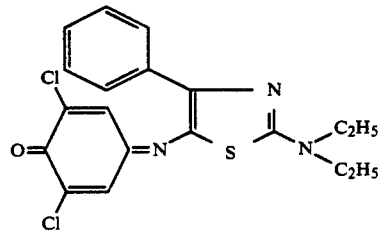

5.9 g of 2,6-dichloroquinonechlorimide (paste about 90% strength) and 7.3 g of 2-diethylamino-4-phenylthiazole were dissolved in 100 ml of glacial acetic acid at room temperature. The solution was subsequently stirred for 30 minutes, in the course of which the temperature rose to 35° C., and ice-water was then added. The resulting oily phase was decanted off, and the solution was diluted with ice-water and adjusted to pH 7.2 with 10% strength sodium hydroxide solution.

The blue precipitate which had formed was filtered off with suction, washed with water and dried in a vacuum drying cabinet at 30° C. Yield: 6.2 g of crude material Column chromatography over silica gel (mobile phase: 8:2 (v/v) toluene/ethyl acetate) gave 3 g of a spectrally pure product. $\lambda_{max}$ (methylene chloride): 617 nm.

Example of the Synthesis by Variant B

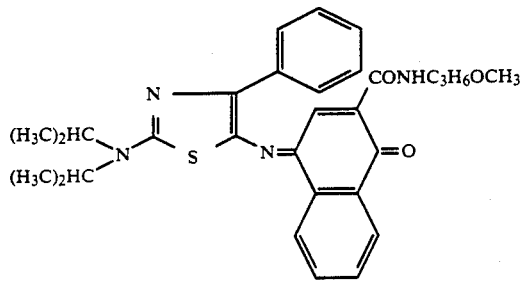

To 12.95 g of 1-hydroxy-8-N-(3-methoxypropyl)-naphthamide in 100 ml of acetic anhydride was added an equimolar amount of 5-nitroso 2-diisopropylaminothiazole, dissolved in 150 ml of methylene chloride, and the mixture was heated up with distillative removal of the methylene chloride. By the time 100° C. was reached, the reaction had ended. The mixture was then cooled down with stirring, 200 ml of methylene chloride were added at 40° C., and acetic anhydride was destroyed by the addition of hot water (60° C.). This was followed by a further 15 minutes' stirring under reflux at 45°-50° C. The phases were then separated in a separating funnel, and the organic phase was concentrated in a rotary evaporator. 400 ml of water were added to the residue, and the aqueous mixture was carefully neutralized with sodium bicarbonate, the target product being obtained in the form of an oil.

1st purification: The oil was dissolved in methylene chloride and the solution was poured through silica gel. Yield: 9.3 g.

2nd purification: Column chromatography, silica gel Mobile phase: ethyl acetate Yield: 3.2 g of spectrally pure product. $\lambda_{max}$ (tetrahydrofuran): 619 nm.

Transfer of the Thiazole Dyes

To be able to test the transfer characteristics of the dyes in a quantitative and simple manner, the heat transfer process was carried out with large hotplates instead of a thermal printing head, the transfer temperature being varied within the range 70° C.<T<120° C. and the transfer time being set at 2 minutes.

α) General Recipe for Coating the Substrates With Dye 1 g of binder were dissolved in 8 ml (8:2 v/v) of toluene/ethanol at from 40° to 50° C. A solution of 0.25 g of dye in 5 ml of tetrahydrofuran was added by stirring. The print paste thus obtained was applied with an 80 μm knife to a sheet of polyester film (thickness: 6-10 μm) and dried with a hairdryer.

β) Testing of Thermal Transferability

The dyes used were tested in the following manner:

The polyester sheet donor containing the dye under test in the coated front was placed face down on a sheet of commercial Hitachi Color Video Print Paper (receiver) and pressed down. Donor/receiver were then wrapped in aluminum foil and heated between two hot plates at different temperatures T (within the temperature range 70° C.<T<120° C.). The amount of dye diffusing into the bright plastic layer of the receiver is proportional to the optical density (=absorbance A). The latter was determined photometrically. If the logarithm of the absorbance A of the colored receiver papers measured within the temperature range from 80° to 110° C. is plotted against the corresponding reciprocal of the absolute temperature, the result is a straight line whose slope gives the activation energy $\Delta E_T$ for the transfer experiment:

$$\Delta E_T = 2.3 \cdot R \cdot \frac{\Delta \log A}{\Delta \left[\frac{1}{T}\right]}$$

To complete the characterization, it is additionally possible to infer from the plots the temperature T*[° C] at which, in the absence of any indication to the contrary, the absorbance A of the colored receiver papers attains the value 1.

The dyes listed in the tables which follow were processed according to α), and the resulting dye-coated substrates were tested in respect of their transfer characteristics according to β). Tables 1 and 2 list in each case the heat transfer parameters T* and $\Delta E_T$, the absorption maxima of the dyes $\lambda_{max}$ (measured in methylene chloride), and the binders used.

The following abbreviations apply:

Br=binder (EC=ethyl cellulose, EHEC=ethylhydroxyethylcellulose AC=cellulose acetobutyrate, MIX=mixture of polyvinyl butyrate and ethylcellulose in a weight ratio of 2:1)

The dyes in Tables 1, 11 and 12 were synthesized by variant A.

The dyes in Tables 2 to 10 were synthesized by variant B. Tables 3 to 10 contain the absorption maxima $\lambda_{max}$ (measured in tetrahydrofuran), the $R_f$ value of the dyes and the mobile phase used in the thin layer chromatography (T=toluene; EA=ethyl acetate - The stated mixing ratios are by volume.). TLC was done on aluminum sheets from Merck (Darmstadt) bearing the designation: silica gel 60 F 254, 0.2 mm, article No. 5554.

TABLE 1

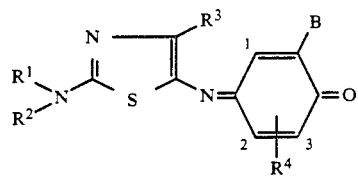

| Example No. | $R^1$ | $R^2$ | $R^3$ | $R^4$ | B | Br | $\lambda_{max}$ [nm] | $T^*$ [°C.] | $\Delta E_T \left[\frac{kcal}{mol}\right]$ |
|---|---|---|---|---|---|---|---|---|---|
| 1 | $C_2H_5$ | $C_2H_5$ | $C_6H_5$ | 3-Cl | Cl | EC | 617 | 82 | 24 |
| 2 | $C_2H_5$ | $C_2H_5$ | Thien-2-yl | H | $NHCOCH_3$ | MIX | 654 | 86 | 16 |

TABLE 2

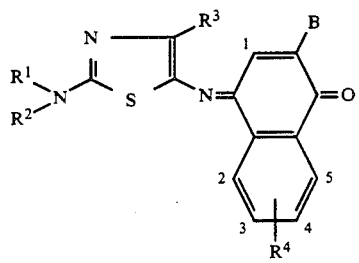

| Example No. | $R^1$ | $R^2$ | $R^3$ | $R^4$ | B | Br | $\lambda_{max}$ [nm] | $T^*$ [°C.] | $\Delta E_T \left[\frac{kcal}{mol}\right]$ |
|---|---|---|---|---|---|---|---|---|---|
| 3 | $CH(CH_3)_2$ | $CH(CH_3)_2$ | $C_6H_5$ | H | $CONHC_7H_{15}$ | MIX | 635 | 81 | 20 |
| 4 | $C_2H_5$ | $C_2H_5$ | Thien-3-yl | H | $CONHC_7H_{15}$ | MIX | 644 | 82 | 15 |
| 5 | $C_2H_5$ | $CH_3OC_3H_6$ | Thien-3-yl | H | $CONHC_7H_{15}$ | MIX | 643 | 85 | 14 |
| 6 | $C_2H_5$ | $H_5C_2(OH_4C_2)_3$ | $C_6H_5$ | H | 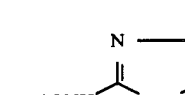 | EC | 670 | 90 | 13 |
| 7 | $C_2H_5$ | $C_2H_5$ | $C_6H_5$ | H | $CONHC_2H_5$ | EC | 627 | 84 | 18 |
| 8 | $C_2H_5$ | $C_2H_5$ | $C_6H_5$ | H | 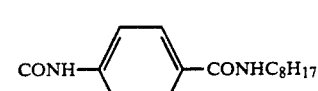 | EC | 655 | 104 | 20 |

TABLE 3

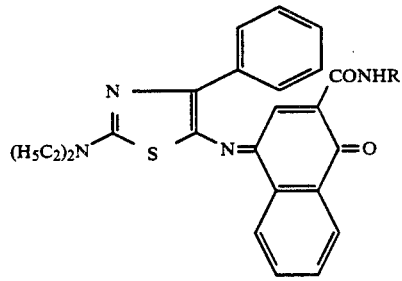

| Example No. | R | $\lambda_{max}$ [nm] | $R_f$ | Mobile phase |
|---|---|---|---|---|
| 9 |  | 644 | 0.36 | T:E 3:2 |

TABLE 3-continued

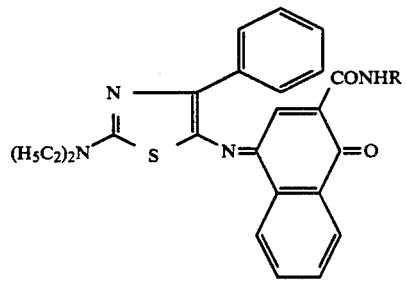

| Example No. | R | $\lambda_{max}$ [nm] | $R_f$ | Mobile phase |
|---|---|---|---|---|
| 10 | $CH_2-CH\begin{matrix}C_4H_9\\C_2H_5\end{matrix}$ | 620 | 0.22 | T:E 9:1 |

TABLE 3-continued

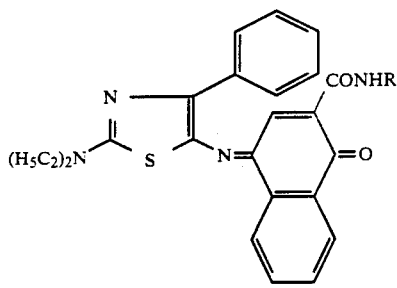

| Example No. | R | $\lambda_{max}$ [nm] | $R_f$ | Mobile phase |
|---|---|---|---|---|
| 11 | (3-pyridyl) | 645 | 0.15 | E |
| 12 | CH(C$_2$H$_5$)(CH$_3$) | 620 | 0.24 | T:E 8:2 |
| 13 | C$_2$H$_4$OCH$_3$ | 619 | 0.17 | E |
| 14 | CH(CH$_3$)C$_3$H$_6$CH(CH$_3$)$_2$ | 620 | 0.42 | T:E 8:2 |
| 15 | C$_2$H$_4$-cyclohexyl | 620 | 0.36 | T:E 8:2 |
| 16 | C$_{18}$H$_{37}$ | 620 | 0.32 | T:E 9:1 |

TABLE 4

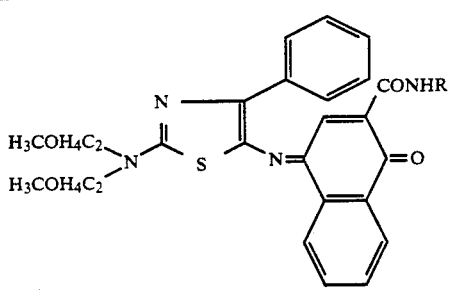

| Example No. | R | $\lambda_{max}$ [nm] | $R_f$ | Mobile phase |
|---|---|---|---|---|
| 17 | C$_2$H$_5$ | 618 | 0.32 | E |
| 18 | C$_2$H$_4$OCH$_3$ | 618 | 0.17 | E |
| 19 | C$_3$H$_6$OCH$_3$ | 618 | 0.16 | E |
| 20 | CH(CH$_3$)(C$_2$H$_5$) | 618 | 0.48 | E |
| 21 | CH$_2$CH(C$_2$H$_5$)(C$_4$H$_9$) | 618 | 0.44 | T:E 3:2 |
| 22 | C$_2$H$_4$-cyclohexyl | 618 | 0.47 | T:E 3:2 |
| 23 | C$_{18}$H$_{37}$ | 618 | 0.43 | T:E 3:2 |

TABLE 4-continued

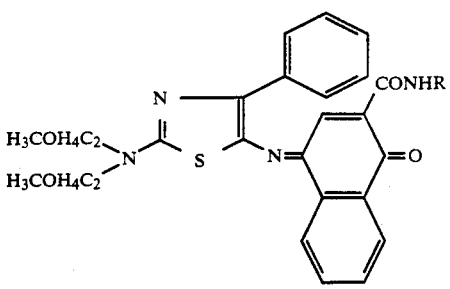

| Example No. | R | $\lambda_{max}$ [nm] | $R_f$ | Mobile phase |
|---|---|---|---|---|
| 24 | CH(CH$_3$)C$_3$H$_6$CH(CH$_3$)$_2$ | 618 | 0.46 | T:E 3:2 |
| 25 | (3-pyridyl) | 643 | 0.096 | E |

TABLE 5

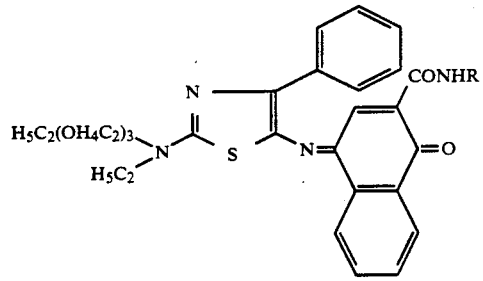

| Example No. | R | $\lambda_{max}$ [nm] | $R_f$ | Mobile phase |
|---|---|---|---|---|
| 26 | C$_2$H$_5$ | 620 | 0.22 | E |
| 27 | C$_2$H$_4$OCH$_3$ | 621 | 0.125 | E |
| 28 | CH$_2$CH(C$_2$H$_5$)(C$_4$H$_9$) | 621 | 0.32 | T:E 3:2 |
| 29 | (3-pyridyl) | 647 | 0.07 | E |

TABLE 6

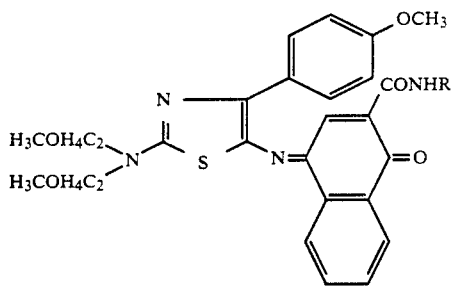

| Example No. | R | λmax [nm] | Rf | Mobile phase |
|---|---|---|---|---|
| 30 | $C_2H_5$ | 636 | 0.17 | E |
| 31 | $C_2H_4OCH_3$ | 636 | 0.098 | E |
| 32 | $C_3H_6OCH_3$ | 636 | 0.14 | E |
| 33 | CH(CH$_3$)(C$_2$H$_5$) | 636 | 0.36 | E |
| 34 | CH$_2$CH(C$_2$H$_5$)(C$_4$H$_9$) | 637 | 0.43 | T:E 3:2 |
| 35 | C$_2$H$_4$—cyclohexyl | 637 | 0.40 | T:E 3:2 |
| 36 | $C_{18}H_{37}$ | 637 | 0.46 | T:E 3:2 |
| 37 | CH(CH$_3$)—C$_3$H$_6$CH(CH$_3$)$_2$ | 637 | 0.37 | T:E 3:2 |
| 38 | 3-pyridyl | 675 | 0.08 | E |

TABLE 7

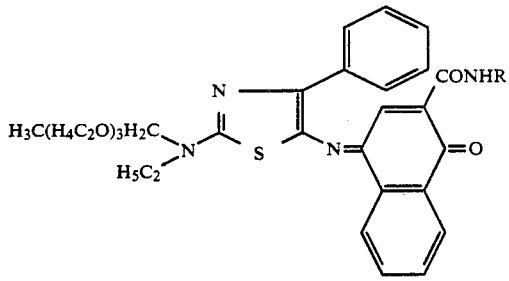

| Example No. | R | λmax [nm] | Rf | Mobile phase |
|---|---|---|---|---|
| 39 | $C_2H_5$ | 622 | 0.12 | E |
| 40 | $C_2H_4OCH_3$ | 622 | 0.068 | E |
| 41 | $C_3H_6OCH_3$ | 622 | 0.05 | E |
| 42 | CH(CH$_3$)(C$_2$H$_5$) | 622 | 0.26 | E |
| 43 | CH$_2$CH(C$_2$H$_5$)(C$_4$H$_9$) | 623 | 0.14 | T:E 3:2 |

TABLE 7-continued

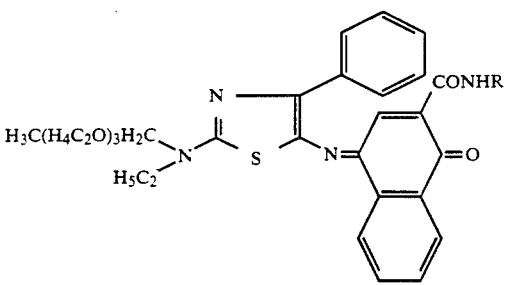

| Example No. | R | λmax [nm] | Rf | Mobile phase |
|---|---|---|---|---|
| 44 | C$_2$H$_4$—cyclohexyl | 622 | 0.21 | T:E 3:2 |
| 45 | $C_{18}H_{37}$ | 622 | 0.23 | T:E 3:2 |
| 46 | CH(CH$_3$)—C$_3$H$_6$CH(CH$_3$)$_2$ | 622 | 0.18 | T:E 3:2 |
| 47 | 3-pyridyl | 649 | 0.04 | E |

TABLE 8

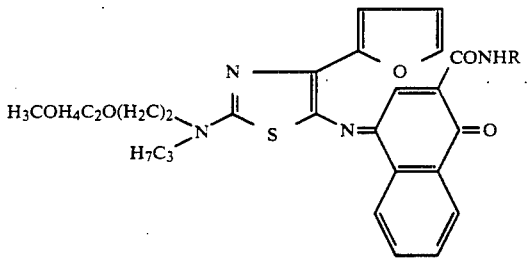

| Example No. | R | λmax [nm] | Rf | Mobile phase |
|---|---|---|---|---|
| 48 | $C_2H_5$ | 644 | — | — |
| 49 | $C_2H_4OCH_3$ | 644 | 0.14 | E |
| 50 | $C_3H_6OCH_3$ | 643 | 0.21 | E |
| 51 | CH(CH$_3$)(C$_2$H$_5$) | 645 | 0.57 | E |
| 52 | CH$_2$CH(C$_2$H$_5$)(C$_4$H$_9$) | 646 | 0.70 | E |
| 53 | C$_2$H$_4$—cyclohexyl | 645 | 0.63 | E |
| 54 | $C_{18}H_{37}$ | 637 | 0.68 | E |
| 55 | CH(CH$_3$)—C$_3$H$_6$CH(CH$_3$)$_2$ | 644 | 0.87 | E |

TABLE 9

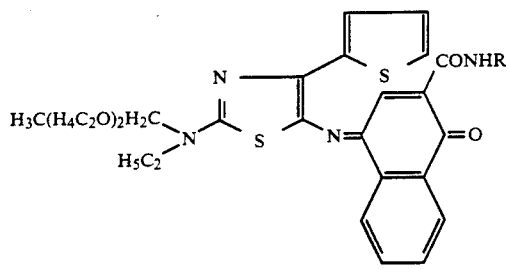

| Example No. | R | $\lambda_{max}$ [nm] | $R_f$ | Mobile phase |
|---|---|---|---|---|
| 56 | $C_2H_5$ | 652 | — | — |
| 57 | $C_2H_4OCH_3$ | 652 | 0.098 | E |
| 58 | $C_3H_6OCH_3$ | 653 | 0.09 | E |
| 59 | CH(CH$_3$)(C$_2$H$_5$) | 653 | 0.42 | E |
| 60 | CH$_2$CH(C$_2$H$_5$)(C$_4$H$_9$) | 653 | 0.31 | T:E 3:2 |
| 61 | C$_2$H$_4$-cyclohexyl | 653 | 0.25 | T:E 3:2 |
| 62 | $C_{18}H_{37}$ | 652 | 0.33 | T:E 3:2 |
| 63 | CH(CH$_3$)-C$_3$H$_6$-CH(CH$_3$)$_2$ | 652 | 0.29 | T:E 3:2 |
| 64 | 3-pyridyl | 691 | — | — |

TABLE 10

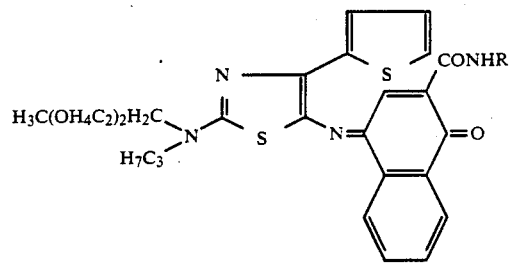

| Example No. | R | $\lambda_{max}$ [nm] | $R_f$ | Mobile phase |
|---|---|---|---|---|
| 65 | $C_2H_5$ | 653 | 0.27 | E |
| 66 | $C_2H_4OCH_3$ | 654 | 0.10 | E |
| 67 | CH$_2$CH(C$_2$H$_5$)(C$_4$H$_9$) | 655 | 0.35 | T:E 3:2 |

TABLE 11

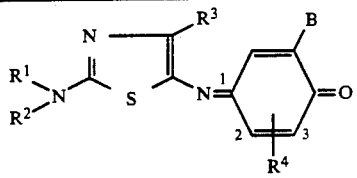

| Example No. | $R^1$ | $R^2$ | $R^3$ | $R^4$ | B | $\lambda_{max}$ [nm] | Solvent |
|---|---|---|---|---|---|---|---|
| 68 | $C_2H_5$ | $C_2H_5$ | 2-Thienyl | 3-NHCOCH$_3$ | H | 655 | Ethanol |
| 69 | $C_2H_5$ | $C_2H_5$ | 2-Thienyl | 3-NHCOCH$_3$ | H | 654 | Methylene chloride |

TABLE 12

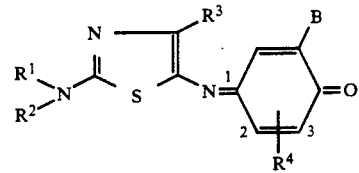

| Example No. | $R^1$ | $R^2$ | $R^3$ | $R^4$ | B | $\lambda_{max}$ [nm] | Solvent |
|---|---|---|---|---|---|---|---|
| 70 | $C_2H_5$ | $C_2H_5$ | $C_6H_5$ | 3-Cl | Cl | 624 | Dimethylformamide |
| 71 | $C_2H_5$ | $C_2H_5$ | $C_6H_5$ | 3-Cl | Cl | 617 | Methylene chloride |
| 72 | $C_2H_5$ | $C_2H_5$ | $C_6H_5$ | 3-Cl | Cl | 626, 660 | Ethanol |
| 73 | $C_2H_5$ | $C_2H_5$ | 4-OCH$_3$-C$_6$H$_4$ | 3-Cl | Cl | 622 | Tetrahydrofuran |

The dyes listed below in Tables 13 and 14 are likewise highly suitable for the diffusion-controlled thermal transfer printing of coated papers.

TABLE 13

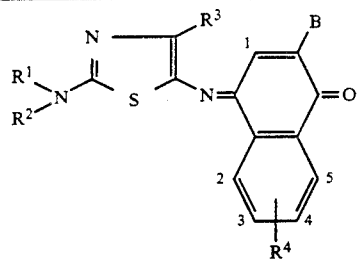

| Example No. | $R^1$ | $R^2$ | $R^3$ | $R^4$ | B | Color |
|---|---|---|---|---|---|---|
| 74 | $C_2H_5$ | $CH(CH_3)_2$ | $C_6H_5$ | H | $CONHC_2H_5$ | Cyan |
| 75 | $C_4H_9$ | $C_2H_5$ | $C_6H_5$ | H | $CONHC_4H_9$ | Cyan |
| 76 | $C_4H_9$ | $C_2H_5$ | $C_6H_5$ | H | $CONHC_6H_5COOC_2H_5$ | Cyan |
| 77 | $C_3H_7$ | $C_3H_7$ | Thien-2-yl | H | $CONHC_2H_5$ | Turquoise |
| 78 | $C_2H_5$ | $C_4H_9$ | Thien-3-yl | H | $CONHC_3H_7$ | Cyan |
| 79 | $C_2H_5$ | $C_4H_9$ | Thien-3-yl | H | $CONHC_6H_4COC_5H_{11}$ | Cyan |
| 80 | $C_2H_5$ | $C_5H_{11}$ | Thien-3-yl | H | $NHCOC_2H_5$ | Cyan |
| 81 | $C_4H_9$ | $CH(CH_3)_2$ | $C_6H_5$ | H | $CONHC_6H_4CONHC_5H_{11}$ | Cyan |
| 82 | $C_2H_5$ | $C_4H_9$ | $C_6H_5$ | 2-$NHSO_2CH_3$ | $CONHC_2H_5$ | Cyan |
| 83 | $C_2H_4CN$ | $C_4H_9$ | –C$_6$H$_4$–OCH$_3$ | H | $CONHC_6H_4OCOC_4H_9$ | Turquoise |
| 84 | $C_3H_7$ | $C_2H_5$ | –C$_6$H$_4$–OCH$_3$ (o) | H | $CONHC_3H_7$ | Cyan |
| 85 | $C_2H_5$ | $C_2H_5$ | –C$_6$H$_4$–CH$_3$ | H | $CONH(C_2H_4O)_2C_2H_5$ | Cyan |
| 86 | $C_4H_9OC_2H_5$ | $C_4H_9$ | $C_6H_5$ | H | $NHCOC_3H_6OC_2H_5$ | Cyan |
| 87 | $C_2H_5$ | $C_4H_9OC_3H_6$ | Thien-3-yl | H | $CONHC_3H_6OC_2H_4OC_6H_5$ | Cyan |
| 88 | $C_2H_5$ | $C_2H_5$ | $C_6H_5$ | 2-$NHCOCH_3$ | $CONHC_3H_6OCH_3$ | Cyan |
| 89 | $C_2H_4CO_2C_2H_5$ | $C_3H_7$ | $C_6H_5$ | H | $CONHC_6H_4CO_2C_3H_7$ | Cyan |
| 90 | $C_2H_5$ | $C_2H_5O_2CC_2H_4$ | Thien-3-yl | H | $NHCOC_6H_4CO_2C_8H_{17}$ | Blue |
| 91 | $C_4H_9$ | $C_2H_5$ | Benzyl | H | $CONHC_4H_9$ | Blue |
| 92 | $C_4H_9$ | $C_4H_9$ | $C_6H_5$ | H | $CO_2C_4H_9$ | Cyan |
| 93 | $CH_3OC_3H_6$ | $C_3H_7$ | cyclohexyl | H | CN | Blue |
| 94 | $C_2H_5$ | $C_2H_5$ | $C_6H_5$ | H | $CONHC_6H_4CONHC_3H_7$ | Cyan |
| 95 | $C_4H_9$ | $C_2H_5$ | $C_6H_5$ | H | $NO_2$ | Cyan |
| 96 | $C_2H_4CO_2C_2H_5$ | $C_4H_9$ | Thien-3-yl | 2-CN | $CONHCH_3$ | Cyan |
| 97 | $C_3H_7$ | $C_2H_5$ | $C_6H_5$ | 5-$CONHC_2H_5$ | H | Blue |
| 98 | $C_4H_9$ | $C_4H_9$ | Thien-3-yl | 5-$NHCOC_2H_5$ | H | Blue |
| 99 | $C_3H_7$ | $C_2H_5$ | –C$_6$H$_4$–CH$_3$ (o) | 2-$CO_2C_3H_7$ | $CONHC_5H_{11}$ | Cyan |

TABLE 14

| Example No. | $R^1$ | $R^2$ | $R^3$ | $R^4$ | B | Color |
|---|---|---|---|---|---|---|
| 100 | $C_4H_9$ | $C_4H_9OC_3H_6$ | $C_6H_5$ | 2-$NO_2$ | $CONHC_4H_9$ | Cyan |
| 101 | $C_2H_5$ | $C_2H_5$ | $C_6H_5$ | 2-$NHCOCH_3$ | $SO_2NHCH_3$ | Cyan |
| 102 | $C_4H_9$ | $C_2H_5$ | $C_6H_5$ | H | $SO_2NHC_2H_5$ | Cyan |

TABLE 14-continued

| | | | | | | |
|---|---|---|---|---|---|---|
| 103 | $C_2H_5$ | $C_3H_7$ | Thien-3-yl | H | $SO_2NH(CH_2)_2C_6H_5$ | Cyan |
| 104 | $C_3H_7$ | $C_3H_7$ | $C_6H_5$ | 2-NHCOCH$_3$ | CN | Cyan |
| 105 | $C_2H_5$ | $C_2H_5$ | Thien-2-yl | H | Cl | Blue |
| 106 | $C_4H_9$ | $C_2H_5$ | $C_6H_5$ | 5-NHCOCH$_3$ | $SO_2NHC_2H_5$ | Cyan |
| 107 | $C_2H_5$ | $C_4H_9$ | Thien-3-yl | 2-Cl | $SO_2NHC_6H_4CO_2CH(CH_3)C_4H_9$ | Cyan |
| 108 | $C_4H_9$ | $C_6H_{13}$ | $C_6H_5$ | 2-OH | $NHCON(C_4H_9)_2$ | Cyan |
| 109 | $C_2H_5$ | $C_4H_9$ | $C_6H_5$ | H | $NHSO_2C_4H_9$ | Cyan |
| 110 | $C_4H_9$ | $C_3H_7$ | Thien-2-yl | H | $NHSO_2(CH_2)_3CH(C_2H_5)CH_3$ | Cyan |
| 111 | $C_2H_5$ | $C_2H_5$ | $C_6H_5$ | 5-NHSO$_2$CH$_3$ | CN | Cyan |
| 112 | $C_4H_9$ | $C_2H_5$ | $C_6H_5$ | 4-Cl | $NHSO_2C_2H_5$ | Cyan |
| 113 | $C_2H_5$ | $C_4H_9$ | cyclohexyl-H | H | $-CONH-C(=N-)-S-$ (thiazolyl) | Cyan |

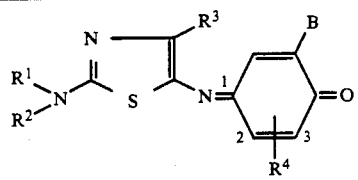

| Example No. | $R^1$ | $R^2$ | $R^3$ | $R^4$ | B | Color |
|---|---|---|---|---|---|---|
| 114 | $C_2H_5$ | $C_4H_9$ | $C_6H_5$ | H | NHCOCH$_3$ | Blue |
| 115 | $C_2H_5$ | $C_4H_9$ | $C_6H_5$ | H | $NHSO_2C_2H_5$ | Blue |
| 116 | $C_3H_7$ | $C_4H_9$ | $C_6H_5$ | 2-NHSO$_2$C$_2$H$_5$ | $CONHC_2H_5$ | Cyan |
| 117 | $C_2H_5$ | $C_4H_9$ | $C_6H_5$ | Cl | $CONHC_2H_5$ | Cyan |
| 118 | $C_4H_9OCH_3$ | $C_2H_5$ | $C_6H_5$ | 2-NHCOCH$_3$ | $CONHC_7H_{15}$ | Cyan |
| 119 | $C_2H_5$ | $C_4H_9$ | $C_6H_5$ | 3-Cl | Cl | Blue |
| 120 | $C_2H_5$ | $C_4H_9$ | Thien-2-yl | 3-Cl | Cl | Cyan |
| 121 | $C_4H_9$ | $C_2H_5$ | Thien-3-yl | 2-Cl | $CONHC_2H_5$ | Cyan |
| 122 | $CH(CH_3)_2$ | $CH(CH_3)_2$ | p-tolyl (CH$_3$-C$_6$H$_4$-) | 2-CN | $NHCOC_2H_5$ | Cyan |
| 123 | $C_2H_5$ | $C_4H_9$ | Thien-3-yl | 2-F | $NHCOC_4H_9$ | Cyan |
| 124 | $C_4H_9$ | $C_2H_5$ | $C_6H_5$ | H | $CO_2C_4H_9$ | Blue |
| 125 | $C_4H_9$ | $C_2H_5$ | $C_6H_5$ | H | $CONH-C_6H_4-C(=O)-OC_6H_{13}$ | Cyan |
| 126 | $C_3H_6OC_2H_5$ | $C_4H_9$ | $C_6H_5$ | H | $CONH-C_6H_4-C_2H_5$ (m-) | Cyan |
| 127 | $C_3H_7$ | $C_2H_5$ | $C_6H_5$ | H | $CONH$-thiazolyl | Cyan |

EXAMPLE 128

The purity of hue of the dye of the formula

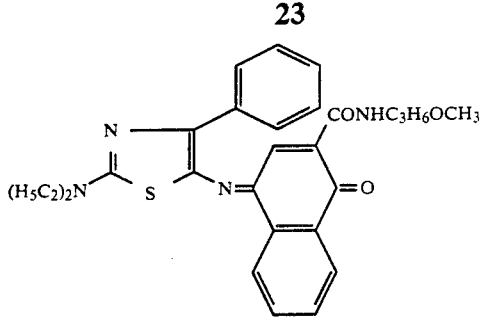
(128a)

was compared in methylene chloride with that of the dyes of the formula

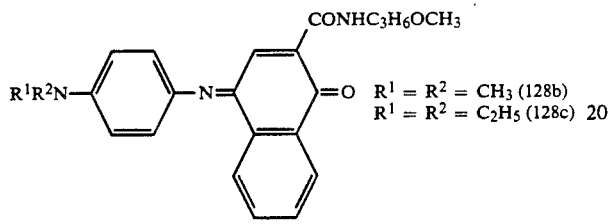

$R^1 = R^2 = CH_3$ (128b)
$R^1 = R^2 = C_2H_5$ (128c)

disclosed in EP-A- 227 096. To this end, the brilliance (chroma), half-value widths of the main absorption band (HVW) and the hue (HGD) were determined by CIELAB within the lightness range L: 60<L<95. (A comparison of different dyes is only meaningful if the lightness and hue are similar).

| Dye No. | Chroma | HVW [nm] | L | HGD | $\lambda_{max}$ [nm] |
|---|---|---|---|---|---|
| 128a | 66 | 109 | 70 | 223 | 625 |
| 128b | 55 | 128 | 70 | 231 | 647 |
| 128c | 61 | 123 | 70 | 223 | 665 |

The abovementioned values reveal the coloristic superiority of dye 128a.

Compared with the known dyes 128b and 128c, the novel dye 128a has a more steeply increasing absorption band and higher transparency in the blue and green region.

We claim:
1. A thiazole dye of the formula I

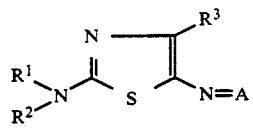  (I)

where $R^1$ and $R^2$ are identical or different and each is independently of the other, $C_1$–$C_{18}$-alkyl, oxaalkyl having up to 18 carbon atoms and from 1 to 3 oxygen atoms, alkanoyloxyalkyl having up to 18 carbon atoms or alkoxy-carbonyloxyalkyl having up to 18 carbon atoms, which may each be substituted by phenyl, $C_1$–$C_4$-alkylphenyl, $C_1$–$C_4$-alkoxyphenyl, hydroxyl, cyclohexyl or cyano; hydrogen; unsubstituted or $C_1$–$C_4$-alkyl- or $C_1$–$C_4$-alkoxy-substituted phenyl; cyclohexyl or a radical of the formula $(CH_2-)_kCOO-(Y-O-)_m(W-O-)_vL^1$, where
k is 2, 3 or 4, m and v are identical or different and each is, independently of the other, 0, 1 or 2,
Y and W are identical or different and each is, independently of the other, $C_2$–$C_6$-alkylene and
$L^1$ is $C_1$–$C_4$-alkyl or unsubstituted or $C_1$–$C_4$-alkyl- or $C_1$–$C_4$-alkoxy-substituted phenyl, or $R^1$ and $R^2$, together with the linking nitrogen atom, are a 5- or 6-membered saturated heterocyclic radical which may contain one further oxygen or nitrogen hetero atom and be substituted by $C_1$–$C_6$-alkyl,
$R^3$ is hydrogen, halogen, $C_1$–$C_8$-alkyl, unsubstituted or $C_1$–$C_4$-alkyl-or $C_1$–$C_4$-alkoxy-substituted phenyl, unsubstituted or $C_1$–$C_4$-alkyl- or $C_1$–$C_4$-alkoxy-substituted benzyl, cyclohexyl, hydroxyl, furyl or thienyl, and
A is a radical of the formula

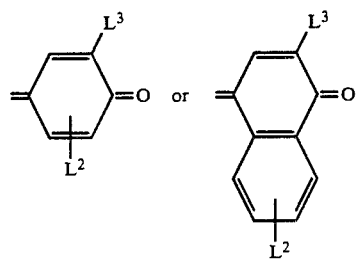

where
$L^2$ is hydrogen, fluorine, chlorine, bromine, hydroxyl, nitro, $C_1$–$C_4$-alkyl, cyano, $C_1$–$C_4$-alkylsulfonylamino or a radical of the formula $COOR^1$, $CONHR^1$, $NHCOR^1$ or $NHSO_2R^1$, in each of which $R^1$ is as defined above, and
$L^3$ is hydrogen, fluorine, chlorine, cyano or a radical of the formula $CONHL^4$, $NHCOL^4$, $NHCONHL^4$, $SO_2NHL^4$, $NHSO_2L^4$ or $COOR^1$, where $R^1$ is as defined above and $L^4$ is in each case alkoxycarbonylphenyl, alkoxycarbonyloxyphenyl, alkanoylphenyl or N-monoalkylcarbamoylphenyl, the alkyl moieties in these groups having up to 12 carbon atoms; phenyl; thiazolyl or $C_1$–$C_{12}$-alkyl, which may be interrupted by from 1 to 3 oxygen atoms.

2. A thiazole dye as claimed in claim 1, having the formula II

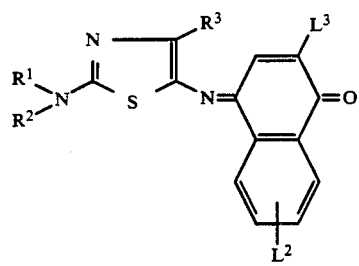  (II)

where
$R^1$ and $R^2$ are each, independently of the other, $C_1$–$C_{12}$-alkyl, oxaalkyl having up to 12 carbon atoms and from 1 to 3 oxygen atoms, alkanoyloxyalkyl having up to 12 carbon atoms or alkoxycarbonylalkyl having up to 12 carbon atoms, or together with the linking nitrogen atom, a 5- or 6-membered saturated heterocyclic radical which may contain one further hetero atom selected from the group consisting of nitrogen and oxygen, $L^2$ is hydrogen or a radical of the formula $CONHR^1$, $NHCOR^1$ or $NHSO_2R^1$, where $R^1$ is in each case as defined above, and $L^3$ is a radical of the formula $CONHL^4$, $NHCOL^4$, $SO_2NHL^4$ or $NHSO_3L^4$, where $R^3$ and $L^4$ are each as defined in claim 1.

3. A process for transferring a merocyanine-like dye from a transfer to plastic-coated paper with the aid of an energy source, which comprises using a transfer on which there is or are situated one or more thiazole dyes of the formula I

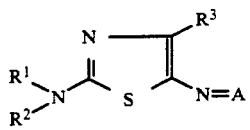
(I)

where $R^1$ and $R^2$ are identical or different and each is, $C_1$–$C_{18}$-alkyl, oxaalkyl having up to 18 carbon atoms and from 1 to 3 oxygen atoms, alkanoyloxyalkyl having up to 18 carbon atoms or alkoxy-carbonyloxyalkyl having up to 18 carbon atoms, which may each be substituted by phenyl, $C_1$–$C_4$-alkylphenyl, $C_1$–$C_4$-alkoxyphenyl, hydroxyl, cyclohexyl or cyano; hydrogen; unsubstituted or $C_1$–$C_4$-alkyl- or $C_1$–$C_4$-alkoxy-substituted phenyl; cyclohexyl or a radical of the formula

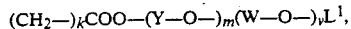

where k is 2, 3 or 4, m and v are identical or different and each is, independently of the other, 0, 1 or 2, Y and W are identical or different and each is, independently of the other, $C_2$–$C_6$-alkylene and $L^1$ is $C_1$–$C_4$-alkyl or unsubstituted or $C_1$–$C_4$-alkyl- or $C_1$–$C_4$-alkoxy-substituted phenyl, or $R^1$ and $R^2$, together with the linking nitrogen atom, are a 5- or 6-membered saturated heterocyclic radical which may contain one further oxygen or nitrogen hetero atom and be substituted by $C_1$–$C_6$-alkyl, $R^3$ is hydrogen, halogen, $C_1$–$C_8$-alkyl, unsubstituted or $C_1$–$C_4$-alkyl- or $C_1$–$C_4$-alkoxy-substituted phenyl, unsubstituted or $C_1$–$C_4$-alkyl- or $C_1$–$C_4$-alkoxy-substituted benzyl, cyclohexyl, hydroxyl, furyl or thienyl, and A is a radical of the formula

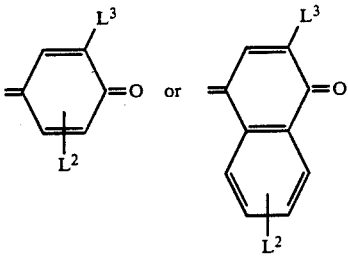

where $L^2$ is hydrogen, fluorine, chlorine, bromine, hydroxyl, nitro, $C_1$–$C_4$-alkyl, cyano, $C_1$–$C_4$-alkylsulfonylamino or a radical of the formula $COOR^1$, $CONHR^1$, $NHCOR^1$ or $NHSO_2R^1$, in each of which $R^1$ is as defined above, and $L^3$ is hydrogen, fluorine, chlorine, cyano or a radical of the formula $CONHL^4$, $NHCOL^4$, $NHCONHL^4$, $SO_2NHL^4$, $NHSO_2L^4$ or $COOR^1$, where $R^1$ is as defined above and $L^4$ is in each case alkoxycarbonylphenyl, alkoxycarbonyloxyphenyl, alkanoylphenyl or N-monoalkylcarbamoylphenyl, the alkyl moieties in these groups having up to 12 carbon atoms, phenyl, thiazolyl or $C_1$–$C_{12}$-alkyl, which may be interrupted by from 1 to 3 oxygen atoms.

* * * * *